March 20, 1962  J. F. HECHTMAN ET AL  3,026,217
FIBER PRODUCTS AND METHODS OF MANUFACTURING COMPRISING BASE
SHEET OF CELLULOSE FIBERS SATURATED WITH A MIXTURE
COMPRISING ELASTOMERIC POLYMER AND POLAR ADJUNCT
POLYMER HAVING CARBOXYLIC ACID FUNCTIONAL GROUP
Filed April 11, 1958

BASE SHEET OF
CELLULOSE FIBERS SATURATED
WITH A MIXTURE COMPRISING:
(1) ELASTOMERIC POLYMER; AND
(2) POLAR ADJUNCT POLYMER HAVING
CARBOXYLIC ACID FUNCTIONAL GROUP

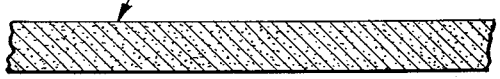

United States Patent Office 3,026,217
Patented Mar. 20, 1962

3,026,217
FIBER PRODUCTS AND METHODS OF MANUFAC-
TURING COMPRISING BASE SHEET OF CELLU-
LOSE FIBERS SATURATED WITH A MIXTURE
COMPRISING ELASTOMERIC POLYMER AND
POLAR ADJUNCT POLYMER HAVING CAR-
BOXYLIC ACID FUNCTIONAL GROUP
John F. Hechtman and Edwin G. Greenman, Munising,
Mich., assignors to Kimberly-Clark Corp., Neenah,
Wis., a corporation of Delaware
Filed Apr. 11, 1958, Ser. No. 727,797
6 Claims. (Cl. 117—155)

This invention relates to saturated fibers, and more particularly to fiber sheets impregnated with compositions having specific adherence thereto. This application is a continuation-in-part of application Serial No. 675,017, filed July 30, 1957.

In the past, various elastomers, including natural and synthetic rubbers, have been the principal commercial saturants for paper impregnation. Elastomer saturants possess the desired physical properties in some degree necessary for paper impregnation. However, even though the elastomers, by themselves, possess desirable tensile and stretch properties, their adhesion to cellulose is poor. The result is that the desirable properties of the elastomer films are not fully imparted to the finished impregnated sheet.

High adhesion of a saturant to the fiber is an important requirement in order to obtain adequate tensile strength and maintain continuity of strain under stress. Adhesion may be obtained by chemical reaction, physical attraction, or mechanical entanglement. Mechanical entanglement alone is inadequate to produce sufficient adhesion and must be supplemented by the other forces. While physical attraction may be adequate when a sheet is dry, it may be destroyed when a sheet is wet. Adhesion by a chemical bond between the saturant and the cellulose, which is not affected by water or other liquids, is highly desirable.

The desirable physical characteristics of a saturated fiber sheet for some uses may be summarized by a property known as "toughness." Although toughness is a complex characteristic, it may be generally defined by the stress-strain properites of a sheet. Toughness attains its highest level by a correct combination of tensile strength and stretch. Among the other desirable characteristics of a saturated sheet are high wet strength properties, high folding endurance, high flexibility, high internal tear, high edge tear, high delamination resistance, and resistance to physical degradation and discoloration due to heat and light aging.

It is, therefore, an object of the invention to provide impregnated sheets which have an enhanced high degree of toughness. It is a further object of the invention to provide a sheet of saturated fibers with an improved high degree of stretch and of desirable dry and wet tensile strength. It is another object of the invention to provide impregnated cellulose sheets having a high degree of flexibility. It is yet another object of the invention to provide the sheets with good fold endurance. It is still another object of the invention to provide a saturated sheet with a high delamination resistance. It is a further object of the invention to provide a saturated sheet with high, internal and edge tear. It is still a further object of the invention to provide a saturated sheet with resistance to physical degradation and discoloration due to heat and light aging. It is another object of the invention to provide a saturant composition that is inexpensive. Further objects of the invention will be apparent from examination of the ensuing description and appendant claims.

Briefly stated, the present invention relates to a paper product comprising a sheet of cellulose fibers impregnated with a composition comprising an elastomer and a compatible adjunct polymer with specific adhesion to cellulose. More particularly, the adjunct polymer has polar functional groups which tend to adhere to cellulose.

The accompanying drawing illustrates in cross-section a product prepared in accordance with the invention in which a base sheet of cellulose fibers is saturated with a mixture comprising an elastomeric polymer and a polar adjunct polymer.

In accordance with the objects of the invention it has been discovered that an adjunct polymer with specific adherence to cellulose imparts its adhesive properties to the elastomer which, by itself, has a low level of adhesion. By this discovery the desirable functional properties of elastomers are imparted to the saturated sheet.

BASE SHEET

The base sheet is an open porous fiber web. The sheet may vary from low to high bonded fibers. Tables I and II below illustrate some of the major properties of typical cellulose base sheets.

*Table I*

PHYSICAL PROPERTIES AND FIBER IDENTIFICATION OF UNSATURATED CELLULOSE BASE SHEETS RANGING FROM LOW BONDED TO HIGH BONDED PAPERS

| Example | 1 | 2 | 3 | 4 | 5 | 6 | 7 | 8 | 9 | 10 |
|---|---|---|---|---|---|---|---|---|---|---|
| Basis weight | 23.8 | 23.9 | 33.6 | 38.5 | 25.6 | 32.0 | 14.0 | 14.2 | 14.0 | 15.5 |
| Caliper | 21.6 | 21.8 | 21.0 | 16.3 | 9.97 | 10.3 | 4.7 | 5.07 | 4.40 | 5.05 |
| Apparent density | 1.10 | 1.09 | 1.60 | 2.36 | 2.57 | 3.10 | 2.98 | 2.80 | 3.18 | 3.10 |
| Tensile sum/lb | 0.078 | 0.066 | 0.08 | 0.120 | 0.164 | .320 | .320 | .370 | 0.450 | 0.67 |
| Tensile ratio | 1.91 | 1.75 | 2.1 | 1.80 | 2.26 | 2.2 | 2.20 | 2.20 | 2.2 | |
| Porosity: | | | | | | | | | | |
| Gurley | 0.25 | .16 | 0.8 | 2.1 | 3.5 | 17.4 | 6.0 | | 7.9 | 27 |
| Frazier | 97 | 114 | 36 | 12.0 | | | | | | |
| Number of presses used in mfg | None | None | None | 2 | 2 | 1 | 1 | 1 | 2 | 2 |
| Relative degree of refining | Slight | Slight | Slight | Hard | Med. | Hard | Med. | Med. | Hard | V. hard |

Table II

LABORATORY BEATER EVALUATION OF VARIOUS PULPS AND IDENTIFICATION OF PULPS NOT COVERED IN TABLE I

| Ex. | Beating time, min. | Basis weight | Appar. dens. | Tensile sum/lb. | Porosity Gurley | Porosity Frazier | Tear | Time of climb, sec. |
|---|---|---|---|---|---|---|---|---|
| 11 | 0 | 16.3 | 1.47 | | | | 144 | |
|    | 5 | 14.3 | 1.59 | | | | 154 | |
|    | 10 | 16.9 | 1.67 | | | | 107 | |
|    | 15 | 17.1 | 1.76 | | | | 84 | |
| 12 | 0 | 20.1 | 2.25 | .0201 | 1.0 | 55 | 13 | 8.2 |
|    | 5 | 15.3 | 2.30 | .0693 | 0.8 | 55 | 23 | 9.7 |
|    | 10 | 16.4 | 2.25 | .1101 | 1.1 | 37 | 44 | 10.5 |
|    | 15 | 15.1 | 2.35 | .1765 | 1.2 | 36 | 58 | 13.9 |
| 13 | 0 | 16.1 | 2.46 | .0454 | 1.4 | | 31 | 11.4 |
|    | 5 | 17.1 | 2.64 | .1255 | 2.2 | | 54 | 15.6 |
|    | 10 | 15.8 | 2.73 | .215 | 2.6 | | 77 | 19.8 |
|    | 20 | 16.4 | 3.12 | .280 | 6.8 | | 102 | 40.1 |
| 14 | 0 | 15.1 | 2.48 | .0364 | 1.8 | | 20 | 14.8 |
|    | 5 | 16.3 | 2.75 | .101 | 3.3 | | 39 | 24. |
|    | 10 | 15.6 | 2.98 | .23 | 5.6 | | 57 | 35.7 |
|    | 20 | 16.3 | 3.31 | .356 | 23.6 | | 45 | 118.0 |
| 15 | 0 | 19.3 | 2.64 | .0995 | 2.4 | | 58 | 14.3 |
|    | 5 | 17.3 | 2.85 | .230 | 3.1 | | 102 | 24.0 |
|    | 10 | 17.3 | 3.05 | .381 | 5.0 | | 151 | 35.1 |
|    | 20 | 17.4 | 3.31 | .586 | 12.8 | | 112 | 87.2 |
| 16 | 0 | 17.3 | 2.97 | .146 | 4.6 | | 70 | 23.0 |
|    | 5 | 17.6 | 3.14 | .222 | 6.9 | | 118 | 41.9 |
|    | 10 | 16.8 | 3.57 | .536 | 11.8 | | 100 | 74.0 |
|    | 20 | 17.1 | 3.86 | .812 | 34.9 | | 79 | 205.6 |
| 17 | 0 | 15.9 | 2.96 | .239 | 6.9 | | 48 | 81.2 |
|    | 5 | 16.6 | 3.55 | .470 | 22.7 | | 46 | 144 |
|    | 10 | 17.1 | 4.04 | .632 | 56.0 | | 40 | 348 |
|    | 20 | 17.3 | 4.52 | .711 | 217.0 | | 40 | [1]1 |
| 18 | 0 | 16.8 | 2.44 | .0218 | 2.9 | | 8 | 28.4 |
|    | 5 | 17.4 | 2.53 | .0408 | 3.5 | | 9 | 34.1 |
|    | 10 | 17.3 | 2.60 | .0578 | 4.6 | | 9 | 47.5 |
|    | 20 | 17.6 | 2.81 | .0986 | 8.4 | | 12 | 88.6 |

[1] Hour.

Fiber identification of pulps used in each of the examples listed in Tables I and II are as follows:

Example 1—Mild alkaline cooked and hypochlorite bleached cotton linters.
Example 2—Kraft pulped spruce fiber. Unbleached, very strong caustic extraction.
Examples 3 and 4—Kraft pulped spruce fiber. Unbleached. Strong caustic extraction.
Example 5—Kraft pulped spruce fiber. Bleached. Conventional alpha treatment.
Example 6—Combination of sulfite pulped spruce fiber with conventional alpha treatment and kraft pulped Norwegian pine. Bleached.
Examples 7 and 8—Combination of kraft pulped spruce fiber and kraft pulped Norwegian pine. Bleached.
Example 9—Kraft pulped Norwegian pine. Bleached.
Example 10—Kraft pulped spruce fiber. Bleached.
Example 11—Same as Example 2.
Example 12—Same as Examples 3 and 4.
Example 13—Same as Example 5.
Example 14—Sulfite pulped spruce fiber. Conventional alpha treatment. Bleached.
Example 15—Same as Example 9.
Example 16—Same as Example 10.
Example 17—Sulfite pulped spruce, balsam and poplar mixture. Hypochlorite bleached.
Example 18—Kraft pulped hard wood mixture. Conventional alpha treated. Bleached.

The units used in the above Tables I and II and also in the specification and claims are defined as follows.

Basis weight: Weight in pounds of a ream of paper 17 inches x 22 inches per 500 sheets, weighed at 50 percent relative humidity and 72° F. Essentially the same as TAPPI Method T410–m–45. All subsequent tests are made on like conditioned paper.

Caliper: Thickness of a single sheet of paper expressed in mils or thousandths of an inch, as by TAPPI Method T411–m–44.

Apparent density: Apparent density is determined by dividing the basis weight by the caliper to yield the ream weight in pounds per mil of thickness.

Dry tensile strength—Machine and cross direction: The breaking strength as determined on a pendulum type tester having a bottom jaw travel of 12 inches per minute. The test is performed on a strip 15 mm. wide, and the tensile strength is reported in kg./15 mm. strip width. TAPPI Method T404–m–50.

Tensile sum per pounds of basis weight: This index is obtained by dividing the sum of the machine and cross direction tensiles in kg./15 mm. by the basis weight.

Tensile ratio: A dimensionless number which is obtained by dividing the machine direction tensile by the cross machine tensile and is primarily used as a restriction in comparing tensile sums of paper having large differences in tensile ratios. Most Fourdrinier saturating papers in the weight range of 10 lbs. up have ratios of 1.4 to 3.5. Cylinder machine grades may have ratios of as high as 10.

Porosity: Gurley porosity is of only limited value in evaluating low bonded papers since the porosity is below the useful range of the instrument. On low bonded papers Gurley porosities have been found of 0.3 second per 100 cc. for eight sheets having a basis weight of 35 lbs. A Frazier porosity tester has been found better suited for determining the porosity of low bonded papers. The units of Frazier porosity are cubic feet of air flow through the material per minute per square foot under a differential head of 0.5 inch of water.

Time of climb: Time in seconds for distilled water to climb 1.0 inch above the water level when the end of a vertically suspended machine direction strip 1.0 inch wide is immersed in the distilled water.

Tear: Internal tearing resistance of paper as described by TAPPI Method T414–m–49.

Although the base sheets are usually formed entirely of cellulose fibers, sheets containing both cellulose and synthetic fibers, or exclusively synthetic fibers, are also satisfactory. These base sheets may be formed on a conventional paper machine, or by other methods.

SATURANT COMPOSITIONS

The paper product of the invention is impregnated with a composition containing an elastomer having in admixture therewith a compatible adjunct polymer with specific adhesion to cellulose. The impregnation is preferably made from aqueous dispersions of the elastomer and adjunct polymer, but may also be made from other systems such as organic solutions of the elastomer and adjunct polymer.

*Elastomers.*—The elastomers usable in the compositions include synthetic rubbers, for example copolymers of acrylonitrile and butadiene; copolymers of butadiene and styrene; polybutadiene; polychloroprene; copolymers of isobutene and isoprene; terpolymers of butadiene, acrylonitrile, and styrene; terpolymers of ethyl acrylate, acrylonitrile, and butadiene; and the like which are polymers and copolymers of conjugated dienes; and natural rubber.

These polymers have been well known impregnants in the past for cellulose fibers, and have constituted the principal commercial saturants to the present time. They are widely reported and discussed in the literature, and in prior patents.

*Adjunct polymers.*—The adjunct polymers have a specific adherence to cellulose. They should be reasonably compatible with the elastomer and possess reasonably similar stress-strain properties.

The adjunct polymer has polar substituent groups with a specific adherence to cellulose, for example carboxylate groups. The adjunct polymer can be a copolymer formed from at least one polymerizable, unsaturated carboxylic acid in which the unsaturation is a double bond, or ethylenic linkage, and at least one alkyl acrylate in which the alkyl group has from one to four carbon atoms. Examples of polymerizable mono-unsaturated α,β-ethylenic carboxylic acids include: acrylic acid, methacrylic acid, itaconic acid, aconitic acid, maleic acid, fumaric acid, and the like. Examples of alkyl acrylates include the esters of primary alkanols, such as methyl acrylate, ethyl acrylate, propyl acrylate and butyl acrylate; and esters of secondary alkanols, such as iso-propyl acrylate, iso-butyl acrylate. These copolymers are of a softness such that hardening comonomers may be introduced. Examples of such hardening comonomers, include the alkyl methacrylates in which the alkyl group may have from one to four carbon atoms, for example, the methyl, ethyl, propyl, iso-propyl, butyl, and iso-butyl methacrylates.

The proportions of the monomers used to produce the copolymer, for example, may be from about 0.5 to about 7% by weight of a carboxylic acid compound, at least 80% by weight of an alkyl acrylate, and from 0% to 19.5% of an alkyl methacrylate.

The following list gives several typical copolymer systems, in which the percentages are by weight:

Ethyl acrylate 84.5%, methyl methacrylate 10.5%, itaconic acid, 5.0%
Ethyl acrylate 85%, methyl methacrylate 10%, acrylic acid 5.0%
Ethyl acrylate 95%, acrylic acid 5%
Ethyl acrylate 95%, methacrylic acid 5%

Techniques for polymerizing the foregoing monomers into the copolymer are further illustrated in Patents Nos. 2,795,564, 2,760,886, 2,790,736 and 2,790,735.

The copolymer dispersions may be made by any of the known emulsion copolymerization procedures, e.g. by first mixing the several monomers in the desired proportions into an aqueous solution of an anionic, or preferably a non-ionic, dispersing or emulsifying agent.

Examples of anionic emulsifying agents that may be used include the higher fatty alcohol sulfates, such as sodium lauryl sulfate, the alkylaryl sulfonates, such as sodium t-octylphenyl sulfonates, the sodium di-octyl sulfosuccinates and so on. Examples of the non-ionic dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene like alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of 6 to 15 carbon atoms; ethylene oxide derivatives of long-changed carboxylic acids, such as lauric, myristic, palmitic, oleic, and the like, or mixtures of acids such as found in tall oil containing 6 to 60 oxyethylene units, etc.; block copolymers of ethylene oxide and propylene oxide comprising a hydrophobic propylene oxide section combined with one or more hydrophilic ethylene oxide sections.

For copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "persalts" such as the alkali metal and ammonium persulfates and perborates, hydrogen peroxide, organic hydroperoxide, such as tert-butyl hydroperoxide and cumene hydroperoxide, and esters such as tert-butyl perbenzoate. Other reducing agents include water-soluble thiosulfates and hydrosulfites. Activators or promoters in the form of the salts (such as the sulfates or chlorides) of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way it is possible to prepare dispersions which contain as little as 1% and as much as 60% or 70% of the resinous copolymer on a weight basis. It is, however, more practical (hence preferred) to produce dispersions which contain about 30% to 50% resin-solids.

In order to obtain wet state, or latex, compatability of the elastomer with the adjunct polymer it might be necessary to replace the anionic emulsifier of the elastomer with a non-ionic emulsifier, so as to prevent coagulation of the anionic elastomer by the polar functional groups, such as carboxylate radicals, of the adjunct polymer. Also, in some instances, it is necessary to adjust the pH of the latex composition, for example, within the range of from 5.0 to 7.5, to maintain a suitable saturant composition viscosity and maintain an adequate degree of penetration of the latex composition into the base sheet.

Salts of heavy metals such as calcium, zinc, barium, and magnesium oxides may be used to improve the solvent resistance, improve the heat and light stability, improve dry tensile strength, and increase the rate of wet strength development on heat aging. Dispersions of zinc oxide have been found particularly suitable in the range of 0.05 to 4.0 parts per 100 parts of the polar adjunct copolymer on a dry solids basis.

Conventional rubber antioxidants may be employed in the composition to enhance the heat and light stabiilty.

SATURATION TECHNIQUES

Saturation of a dry sheet may be accomplished in the following manner. Roll stock of unsaturated base paper is fed into the saturating head. The saturating head may be a float tank prior to the squeeze rolls in which the paper is floated on the surface of an aqueous dispersion, or latex, of the saturant composition and becomes impregnated by capillary forces carrying the saturant into the sheet. Another type of saturating head is a shower pipe at the squeeze roll. The sheet is passed into the squeeze roll nip at a downward angle and the saturant latex is supplied by means of a shower pipe to the trough formed by the paper and top squeeze roll. Excess latex is removed by squeeze rolls, water is evaporated by passing the sheet over heated can driers, and the dried sheet is wound up in a roll. As alternate drying methods, a festoon or tunnel driers may be used.

The ratio of dry saturant composition to fiber for a given base sheet is controlled primarily by the dry solids of the saturant. A secondary but minor control is effected by the nip pressure on the squeeze rolls.

The latex may contain solids in the range of about 0.1 to about 65 percent depending upon the saturant to fiber ratio desired in the saturated product, although the usual range is from about 20 to 50 percent. A majority of products are made within the range from about 35 to about 160 parts of dry saturant per 100 parts by weight of fiber, although it is possible to produce useful products in the range of 0.1 to 200 parts dry saturant per 100 parts by weight of fiber, depending on the apparent density and void volume of the base sheet. Low fiber to fiber bonded sheets, by virtue of their low apparent density, offer the opportunity of obtaining high ratios of saturant to fiber. For example, a medium bonded sheet using a saturant with 50% dry solids can obtain a pickup of 100 parts of saturant as dry solids, while low bonded sheets pick up 200 parts of saturant as dry solids per 100 parts by weight of dry fiber.

In general, pickups in the range of 35 to 75 parts appear to be optimum, both from the standpoint of economics and physical property performance. On the other hand, pickups are set at the level required for the sheet to perform properly in its end use. For example, when high delamination, abrasion, and scuff resistance are required, the pickup level may be set at 75 to 160 parts per 100 parts by weight of fibers.

A heat treatment step of the dried sheet following impregnation causes important changes in saturated sheet properties. The tables below illustrate these changes and their magnitude. Wet tensile and wet stretch show the most dramatic change.

Heat treatment may be performed by winding the dry saturated sheet up in the roll at a predetermined temperature after which the roll is stored at a like temperature for a predetermined length of time. The curing reaction during heat treatment is stopped by rewinding the roll to reduce the temperature. Heat treatments of 0.5 to 20 hours at temperatures above 100° C. may be employed, although about 1 to about 7 hours at about 105° C. are most generally used. Naturally, practical equivalent time-temperature relationships may be used.

The following examples are given to further illustrate the invention. All percentages and parts are by weight. Pickup is listed as pphp which refers to the pickup of saturant composition in parts per hundred parts of dry fiber.

*Table III—Part I*

SATURANT FORMULATIONS — MAJOR COMPONENTS — AND SATURANT PICKUPS — PARTS DRY SATURANT PER 100 DRY FIBER — ON MEDIUM HIGH BONDED FLATBACK TAPE STOCK

| Example | A | B | C |
|---|---|---|---|
| Elastomer [1] | 100 | 100 | 100 |
| Polar adjunct [2] | 0 | 20 | 40 |
| Antioxidant | 1.5 | 1.5 | 1.5 |
| Titanium dioxide | 15 | 15 | 15 |
| Percent total solids | 45 | 45 | 45 |
| Pickup—pphp | 76 | 76 | 75 |

[1] Copolymer of acrylonitrile (31.5%) with butadiene (68.5%). Total solids—54%. Particle size—1,500 A. Emulsifier system—anionic. Mooney viscosity—65 (ML-4).
[2] Acrylate copolymer of ethyl acrylate (85%), methyl methacrylate (10%), and a carboxylic acid compound (5%).

*Table III—Part II*

PHYSICAL PROPERTIES OF SATURATED SHEETS—HEAT TREATED (HT) AND UNTREATED (U)—FROM SATURANTS IN TABLE I

| | A | | | B | | | C | | |
|---|---|---|---|---|---|---|---|---|---|
| | U | HT[1] | HT[2] | U | HT[1] | HT[2] | U | HT[1] | HT[2] |
| Basis weight | 22.2 | 22.1 | 22.1 | 22.3 | 22.3 | 22.1 | 22.2 | 22.3 | 22.2 |
| Apparent density | 5.29 | 5.02 | 5.10 | 5.27 | 5.11 | 5.30 | 5.29 | 5.14 | 5.26 |
| Dry tensile: | | | | | | | | | |
| MD | 4.5 | 4.6 | 4.7 | 5.2 | 5.1 | 5.3 | 5.5 | 5.6 | 5.5 |
| CD | 2.4 | 2.6 | 2.6 | 2.7 | 2.7 | 2.7 | 3.0 | 3.0 | 3.0 |
| Dry stretch: | | | | | | | | | |
| MD | 7.5 | 8.3 | 10.2 | 12.5 | 10.8 | 10.8 | 12.0 | 11.2 | 8.9 |
| CD | 17.9 | 16.5 | 16.1 | 25.6 | 21.0 | 21.7 | 26.6 | 21.8 | 21.2 |
| Wet tensile, MD | 0.20 | 0.45 | 0.64 | 0.34 | 1.90 | 2.21 | 0.41 | 2.32 | 2.57 |
| Wet stretch, MD | 0.0 | 6.2 | 6.8 | 4.7 | 12.3 | 14.3 | 5.4 | 12.4 | 13.0 |
| Fold, MD | 248 | 223 | 233 | 243 | 255 | 224 | 304 | 346 | 385 |
| Delamination resistance, MD | 642 | 648 | 719 | 752 | 877 | 829 | 886 | 976 | 976 |
| Reflectance—$R_\infty 458$ | 78.0 | 69.0 | 66.1 | 79.2 | 74.1 | 71.1 | 79.1 | 73.8 | 71.5 |

[1] Heat treated 3 hrs. at 105° C.
[2] Heat treated 6 hrs. at 105° C.

*Table III—Part III*

PHYSICAL PROPERTIES OF UNSATURATED BASE SHEET—FLATBACK TAPE STOCK—MEDIUM HIGH BONDED

| | |
|---|---|
| Basic weight | 12.5 |
| Apparent density | 3.1 |
| Tensile sum/lb | 0.41 |
| Tensile ratio | 2.2 |
| Time of climb | 7.5 |
| Porosity, Gurley | 42.0 |

*Table IV—Part I*

SATURANT FORMULATIONS—MAJOR COMPONENTS—AND SATURANT PICKUPS—PARTS DRY SATURANT PER 100 PARTS DRY FIBER—ON MEDIUM BONDED FLATBACK TAPE STOCK

[Dry parts]

| Example | D | E | F | G | H | I | J |
|---|---|---|---|---|---|---|---|
| Elastomer [1] | 100 | 100 | 100 | 100 | 100 | 100 | 100 |
| Polar adjunct [2] | 0 | 15 | 30 | 45 | 60 | 75 | 100 |
| Antioxidant | 1.5 | 1.5 | 1.5 | 1.5 | 1.5 | 1.5 | 1.5 |
| Percent total solids | 45 | 45 | 45 | 45 | 45 | 45 | 45 |
| Pickup—pphp | 97 | 93 | 95 | 98 | 95 | 89 | 93 |

[1] Copolymer of acrylonitrile (31.5%) with butadiene (68.5%). Total solids—54%. Particle size—1,500 A. Emulsifier system—anionic. Mooney viscosity—65 (ML-4).
[2] Acrylate copolymer of ethyl acrylate (95%) and a carboxylic acid compound (5%).

Table IV—Part II

PHYSICAL PROPERTIES OR SATURATED SHEETS—HEAT TREATED (HT) AND UNTREATED (U)—FROM SATURANTS IN TABLE IV, PART I

|  | D | | E | | F | | G | | H | | I | | J | |
|---|---|---|---|---|---|---|---|---|---|---|---|---|---|---|
|  | U | HT[1] | U | HT[1] | U | HT[1] | U | HT[1] | U | HT[1] | U | HT[1] | U | HT[1] |
| Basis weight | 23.8 | 23.5 | 23.7 | 23.3 | 24.6 | 23.8 | 25.1 | 24.9 | 24.7 | 24.2 | 24.0 | 24.0 | 24.5 | 23.8 |
| App. density | 4.69 | 4.67 | 4.81 | 4.93 | 4.78 | 4.76 | 4.85 | 5.00 | 5.15 | 5.01 | 4.85 | 4.85 | 4.92 | 4.98 |
| Tensile: | | | | | | | | | | | | | | |
| MD | 4.3 | 4.4 | 4.5 | 4.8 | 4.8 | 5.2 | 5.2 | 5.2 | 5.4 | 5.6 | 5.7 | 6.0 | 5.8 | 6.0 |
| CD | 1.9 | 2.2 | 1.8 | 1.9 | 2.2 | 2.2 | 2.3 | 2.5 | 2.5 | 2.7 | 2.4 | 2.5 | 2.7 | 2.8 |
| Stretch: | | | | | | | | | | | | | | |
| MD | 7.8 | 10.4 | 16.4 | 13.4 | 12.1 | 12.9 | 14.3 | 15.8 | 15.1 | 13.0 | 11.5 | 13.8 | 13.0 | 11.4 |
| CD | 16.8 | 22.5 | 26.8 | 23.4 | 25.9 | 27.5 | 28.5 | 26.4 | 30.3 | 26.6 | 23.1 | 24.0 | 24.3 | 27.0 |
| Wet tensile, MD | 0.25 | 1.07 | 0.58 | 2.66 | 0.69 | 3.28 | 0.85 | 3.50 | 0.60 | 3.52 | 0.62 | 3.79 | 0.61 | 3.51 |
| Wet stretch, MD | 8.3 | 6.0 | 4.0 | 14.8 | 4.9 | 16.8 | 5.1 | 15.4 | 4.3 | 16.5 | 5.1 | 12.4 | 5.4 | 15.8 |
| Fold: | | | | | | | | | | | | | | |
| MD | 201 | 363 | 215 | 377 | 191 | 341 | 299 | 526 | 628 | 872 | 684 | 1,163 | 788 | 1,172 |
| CD | 46 | 91 | 60 | 90 | 49 | 63 | 68 | 110 | 114 | 174 | 117 | 272 | 252 | 274 |
| Delam. resist., MD | 575 | 819 | 696 | 762 | 865 | 925 | 1,050 | 1,120 | 1,148 | 1,171 | 1,021 | 1,214 | 947 | 1,259 |

[1] Heat treated 5 hrs. at 105° C.

Table IV—Part III

PHYSICAL PROPERTIES OF UNSATURATED BASE SHEET—FLATBACK TAPE STOCK BASE—MEDIUM BONDED

| | |
|---|---|
| Basis weight | 13.1 |
| Caliper | 4.65 |
| Apparent density | 2.82 |
| Tensile sum/lb | 0.35 |
| Ratio | 2.54 |
| Gurley porosity | 4.1 |
| Time of climb | 28.3 |

Table V—Part I

SATURANT FORMULATIONS—MAJOR COMPONENTS—AND SATURANT PICKUP—PARTS DRY SATURANT PER 100 PARTS DRY FIBER—ON MEDIUM BONDED CREPED TAPE STOCK

[Dry parts]

| Example | K | L |
|---|---|---|
| Elastomer[1] | 100.0 | 100.0 |
| Polar adjunct[2] | 30.0 | 40.0 |
| Phenolic resin | 4.0 | 4.0 |
| Percent total solids | 45.0 | 45.0 |
| Pickup—pphp | 93.0 | 97.0 |

[1] Copolymer of acrylonitrile (31.5%) with butadiene (68.5%). Total solids—54%. Particle size 1500 A. Emulsifier system—anionic. Mooney viscosity—65 (ML-4).
[2] Acrylate copolymer of ethyl acrylate (95%) and a carboxylic acid compound (5%).

Table V—Part II

PHYSICAL PROPERTIES OF SATURATED SHEETS—HEAT TREATED (HT) AND UNTREATED (U)—FROM SATURANTS IN TABLE III—PART I

|  | K | | L | |
|---|---|---|---|---|
|  | U | HT[1] | U | HT[1] |
| Basis weight | 23.6 | 23.2 | 23.8 | 23.9 |
| Apparent density | 3.55 | 3.49 | 3.56 | 3.66 |
| Tensile: | | | | |
| MD | 5.0 | 5.2 | 5.2 | 5.5 |
| CD | 2.5 | 2.6 | 2.5 | 2.6 |
| Stretch: | | | | |
| MD | 24.3 | 21.4 | 21.3 | 22.6 |
| CD | 21.0 | 15.9 | 23.1 | 23.4 |
| Wet Tensile: | | | | |
| MD | 1.1 | 3.0 | 1.2 | 3.1 |
| CD | 0.5 | 1.3 | 0.5 | 1.4 |
| Fold: | | | | |
| MD | 864 | 936 | 1,202 | 1,428 |
| CD | 82 | 87 | 72 | 106 |
| Delamination resistance, MD | 839 | 997 | 834 | 1,077 |

[1] Heat treated—5 hrs. at 105°C.

Table V—Part III

PHYSICAL PROPERTIES OF UNSATURATED BASE SHEET—CREPED TAPE STOCK—MEDIUM BONDING

| | |
|---|---|
| Basis weight | 12.7 |
| Apparent density | 2.17 |
| Tensile sum/lb | 0.321 |
| Ratio | 2.33 |
| Stretch | 15 |
| Gurley porosity | 2.8 |
| Time of climb | 35 |

NOTE.—Base paper fiber furnish, unbleached spruce kraft, specifically "Solka 15."

Table VI—Part I

SATURANT FORMULATIONS—MAJOR COMPONENTS—AND SATURANT PICKUPS—PARTS DRY SATURANT PER 100 PARTS DRY FIBER—ON MEDIUM HIGH BONDED FLATBACK TAPE STOCK[1]

| Example | M | N | O | P |
|---|---|---|---|---|
| Elastomer[2] | 100 | 100 | 100 | 100 |
| Polar Adjunct[3] | 0 | 30 | 100 | 300 |
| Antioxidant | 1.2 | 1.2 | 1.2 | 1.2 |
| Percent total solids | 45 | 45 | 45 | 45 |
| Pickup—pphp | 77 | 73 | 73 | 85 |

[1] See Table III—Part III for base paper physical properties and furnish.
[2] Copolymer of styrene (26%) with butadiene (74%). Total solids—60-62%. Emulsifier system—anionic. Particle size—large.
[3] Acrylate copolymer of ethyl acrylate (85%), methyl methacrylate (10%), and carboxylic acid compound (5%).

Table VI—Part II

PHYSICAL PROPERTIES OF SATURATED SHEETS—HEAT TREATED (HT) AND UNTREATED (U)—FROM SATURANTS IN TABLE IV, PART I

|  | M | | N | | O | | P | |
|---|---|---|---|---|---|---|---|---|
|  | U | HT[1] | U | HT[1] | U | HT[1] | U | HT[1] |
| Basis weight | 22.7 | 22.4 | 21.9 | 21.9 | 22.3 | 22.2 | 23.1 | 23.3 |
| Apparent density | 5.11 | 5.00 | 5.13 | 5.17 | 5.14 | 5.19 | 5.44 | 5.50 |
| Tensile: | | | | | | | | |
| MD | 3.2 | 3.4 | 3.7 | 3.9 | 4.8 | 4.9 | 6.0 | 6.3 |
| CD | 1.9 | 2.1 | 2.3 | 2.4 | 3.0 | 3.3 | 4.0 | 4.1 |
| Stretch: | | | | | | | | |
| MD | 12.0 | 6.1 | 26.0 | 20.5 | 15.6 | 15.5 | 6.5 | 6.4 |
| CD | 14.3 | 13.6 | 36.0 | 30.5 | 21.6 | 22.0 | 12.4 | 11.9 |
| Wet tensile, MD | 0.21 | 0.32 | 0.24 | 1.04 | 0.43 | 2.07 | 0.61 | 2.82 |
| Wet stretch, MD | 0.0 | 4.8 | 0.0 | 9.5 | 3.6 | 12.9 | 5.9 | 12.1 |
| Delamination resist., MD | 428 | 476 | 515 | 533 | 528 | 685 | 631 | 780 |

[1] Heat treated 5 hours at 105° C.

Table VII—Part I

SATURANT FORMULATIONS—MAJOR COMPONENTS—AND SATURANT PICKUPS—PARTS DRY SATURANT PER 100 PARTS DRY FIBER—ON LOW BONDED FLAT STOCK

| Example | Q | R | S | T | U | V |
|---|---|---|---|---|---|---|
| Natural rubber[1] | 100.0 | 100.0 | 100.0 | 100.0 | 100.0 | 100.0 |
| Polar adjunct[2] |  | 20.0 | 40.0 | 60.0 | 80.0 | 100.0 |
| Antioxidant | 1.0 | 1.0 | 1.0 | 1.0 | 1.0 | 1.0 |
| Percent total solids | 30.0 | 30.0 | 30.0 | 30.0 | 30.0 | 30.0 |
| Pickup—pphp | 62.8 | 54.3 | 64.3 | 59.4 | 57.6 | 60.0 |

[1] Centrifuged, ammonium hydroxide stabilized, Liberian natural rubber latex. Total solids—60%.
[2] Acrylate copolymer of ethyl acrylate (85%), methyl methacrylate (10%), and a carboxylic acid compound (5%).

Table VII—Part II
PHYSICAL PROPERTIES OF SATURATED SHEETS—HEAT TREATED (HT) AND UNTREATED (U)—FROM SATURANTS IN TABLE VII, PART I

|  | Q | | R | | S | | T | | U | | V | |
| --- | --- | --- | --- | --- | --- | --- | --- | --- | --- | --- | --- | --- |
|  | U | HT[1] | U | HT[1] | U | HT[1] | U | HT[1] | U | HT[1] | U | HT[1] |
| Basis weight | 37.0 | ------ | 35.5 | ------ | 37.7 | ------ | 36.3 | ------ | 35.8 | ------ | 36.0 | ------ |
| Apparent density | 3.81 | ------ | 3.38 | ------ | 3.59 | ------ | 3.45 | ------ | 3.62 | ------ | 3.51 | ------ |
| Tensile: | | | | | | | | | | | | |
| MD | 4.2 | 5.7 | 5.3 | 6.5 | 6.4 | 7.8 | 6.9 | 8.4 | 7.2 | 8.5 | 7.5 | 8.7 |
| CD | 2.6 | 3.3 | 3.1 | 3.8 | 4.2 | 4.8 | 4.1 | 5.5 | 4.4 | 5.6 | 4.9 | 5.2 |
| Stretch: | | | | | | | | | | | | |
| MD | 7.9 | 9.8 | 9.8 | 10.3 | 11.0 | 13.0 | 11.1 | 13.1 | 11.8 | 13.5 | 11.6 | 13.0 |
| CD | 15.5 | 15.1 | 15.9 | 16.0 | 17.8 | 23.0 | 19.3 | 20.6 | 17.8 | 21.6 | 20.0 | 19.3 |
| Wet tensile, MD | 0.21 | 1.35 | 0.22 | 2.24 | 0.28 | 3.31 | 0.29 | 3.65 | 0.27 | 3.71 | 0.32 | 3.91 |
| Wet stretch, MD | 0.0 | 11.1 | 0.0 | 14.5 | 0.0 | 16.9 | 0.0 | 17.6 | 0.0 | 17.9 | 0.0 | 18.9 |
| Fold, MD | 1,430 | 3,350 | 1,020 | 2,700 | 2,040 | 4,120 | 2,420 | 4,450 | 3,160 | 5,560 | 4,070 | 5,180 |

[1] Heat treated 5 hours at 105° C.

Table VII—Part III
PHYSICAL PROPERTIES OF UNSATURATED BASE SHEET—LOW FIBER TO FIBER BONDED UNAGED SHEET

| | |
| --- | --- |
| Basis weight | 24.9 |
| Apparent density | 2.38 |
| Tensile sum/lb. | 0.09 |
| Tensile ratio | 1.83 |
| Time of climb | 8.0 |
| Porosity, Frazier | 17 |

Table VIII—Part I
SATURANT FORMULATIONS—MAJOR COMPONENTS—AND SATURANT PICKUP—PARTS DRY SATURANT PER 100 PARTS DRY FIBER—ON LOW BONDED FLAT STOCK

| Example | W | X | Y | Z |
| --- | --- | --- | --- | --- |
| Elastomer [1] | 100.0 | 100.0 | 100.0 | 100.0 |
| Polar Adjunct [2] | 0 | 20.0 | 40.0 | 60.0 |
| Antioxidant | 1.5 | 1.5 | 1.5 | .5 |
| Percent total solids | 30.0 | 30.0 | 30.0 | 30.0 |
| Pickup—pphp | 60.2 | 59.2 | 57.0 | 58.2 |

[1] Copolymer of acrylonitrile (31.5%) with butadiene (68.5%). Total solids—40%. Emulsifier system—anionic rosin soap; particle size—small—600 Å.
[2] Acrylate copolymer of ethylacrylate (85%), methyl methacrylate (10%) and carboxylic acid compound (5%).

NOTE.—See Table VII—Part III for Unsaturated Sheet Properties.

Table VIII—Part II
PHYSICAL PROPERTIES OF SATURATED SHEETS—HEAT TREATED (HT) AND UNTREATED (U)—FROM SATURANTS IN TABLE VIII

|  | W | | X | | Y | | Z | |
| --- | --- | --- | --- | --- | --- | --- | --- | --- |
|  | U | HT[1] | U | HT[1] | U | HT[1] | U | HT[1] |
| Basis weight | 35.6 | ------ | 36.4 | ------ | 36.3 | ------ | 36.2 | ------ |
| Apparent density | 3.49 | ------ | 3.75 | ------ | 3.66 | ------ | 3.55 | ------ |
| Tensile: | | | | | | | | |
| MD | 4.5 | 5.6 | 5.0 | 5.9 | 6.1 | 7.4 | 7.2 | 8.3 |
| CD | 2.6 | 3.5 | 3.0 | 3.8 | 3.6 | 4.8 | 4.4 | 5.1 |
| Stretch: | | | | | | | | |
| MD | 37.6 | 25.5 | 38.7 | 21.4 | 30.5 | 22.3 | 29.4 | 19.0 |
| CD | 67.0 | 42.5 | 71.0 | 46.0 | 54.1 | 39.4 | 50.6 | 33.8 |
| Wet tensile, MD | 0.18 | 1.40 | 0.22 | 1.51 | 0.26 | 2.91 | 0.32 | 3.56 |
| Wet stretch, MD | 0.0 | 13.3 | 0.0 | 14.6 | 0.0 | 19.0 | 13.1 | 20.0 |
| Fold, MD | 130 | 430 | 165 | 381 | 260 | 735 | 400 | 1,310 |

[1] Heat treated—6 hours at 105° C.

The units used in the above Tables III through VIII, and elsewhere in the specification, have been previously defined in connection with Tables I and II except the following, which are set forth below.

M.I.T. fold: TAPPI Standard Method T423–m–50; II, M.I.T. folding endurance.

Wet tensile and stretch: These data are obtained in the same manner as the dry properties with exception that the strips are completely wet with water and the average loading rate is 0.6 kg./sec.

Delamination resistance: This test indicates the resistance to internal splitting of a sheet. The test involves adhering a cloth tape to each side of the sheet, mechanically starting a separation of the cloth tape in such a manner that the saturated sheet is split down the middle, and finally placing the two tape ends leading to the split in the jaws of the tensile tester as a means of determining the force required to sustain the splitting. In our case, strips 15 millimeters wide are tested, and the rate of splitting is at four inches per minute. Results are expressed in grams per 15 mm. strip width.

Reflectance $R_x458$ or brightness: The procedure for determining the brightness is covered by TAPPI Standard Method T452–m–48, brightness of paper. In the case of paper making fibers which inherently tend to be yellow in color, the brightness of a sheet is a measure of its potential "whiteness." Most synthetic and natural polymers tend to also be yellow in color, thus the "brightness" of a combination of fibers and elastomers is a good measure of the potential "whiteness."

The adjunct polymer may be employed in the range from about 10 to about 200 parts, preferably about 20 to about 80 parts, by weight per 100 parts by weight of the elastomers. Within these ranges the properties of the saturated sheet are optimum for the particular saturant composition employed.

Subsequent mechanical treatment of the saturated sheet is often used to produce a variety of effects. Calendering and super-calendering have been used to increase the apparent density and soften the saturated sheet as well as to improve the surface for coating. For a number of end uses it is desirable to emboss the saturated sheet with a variety of patterns and pattern depths.

Saturated sheets described herein may be used for abrasive papers, glue coated tape stocks, pressure sensitive tape stocks, protective masking sheets, artificial leather stocks, artificial chamois, pennant and banner stock, labels, book cover stock, automobile trim panel base stock, projection screens, printing press top cover sheets, gaskets, cloth replacements, window shades, and the like.

A distinct advantage of saturated sheets of the invention is the ability to meet the requirement for high temperature end uses. Solvent resistance is also enhanced in the impregnated sheets disclosed herein.

It should be noted that nearly all of the ultimate products require subsequent coating, spreading, or laminating operations on the saturated base sheet. Herein lies a distinctly advantageous feature of the disclosed saturated sheets. The same forces which promote adhesion of the saturant composition to fibers also promote adhesion of a variety of widely used coating materials. Good adhesion between saturated sheets of the invention and plasticized vinyl chloride, pyroxylin, acrylates, Buna-N, abrasive paper varnishes, animal glues, pressure sensitive masses, and the like is obtained.

Other modes of applying the principle of the invention may be employed, change being made as regards the details described, provided the features stated in any of the following claims or the equivalent of such be employed.

We, therefore, particularly point out and distinctly claim as our invention:

1. A product comprising a sheet of cellulose fibers impregnated with a composition comprising an elastomeric polymer in admixture with a separate compatible adjunct polymer with specific adherence to said fibers, said elastomeric polymer selected from the class consisting of polymers and copolymers of conjugated dienes, and natural rubber, said adjunct polymer formed from about 0.5% to about 7% by weight of at least one polymerizable $\alpha,\beta$-ethylenic carboxylic acid, at least 80% by weight of at least one alkyl acrylate in which the alkyl group has from one to four carbon atoms, and from 0 to 19.5% by weight of at least one alkyl methacrylate in which the alkyl group has from one to four carbon atoms, said adjunct polymer ranging from about 10 parts to about 200 parts by weight per 100 parts by weight of said elastomer.

2. The product of claim 1 wherein said elastomeric polymer is natural rubber.

3. The product of claim 1 wherein said elastomeric polymer is a copolymer of acrylonitrile and butadiene.

4. The product of claim 1 wherein said elastomeric polymer is a copolymer of butadiene and styrene.

5. The process for preparing a product which comprises impregnating a sheet of cellulose fibers with a liquid suspension of an elastomeric polymer in admixture with a separate compatible adjunct polymer having specific adhesion to said fibers, said elastomeric polymer selected from the class consisting of polymers and copolymers of conjugated dienes, and natural rubber, said adjunct polymer formed from about 0.5% to about 7% by weight of at least one polymerizable $\alpha,\beta$-ethylenic carboxylic acid, at least 80% by weight of at least one alkyl acrylate in which the alkyl group has from one to four carbon atoms, and from 0 to 19.5% by weight of at least one alkyl methacrylate in which the alkyl group has from one to four carbon atoms, said adjunct polymer ranging from about 10 parts to about 200 parts by weight per 100 parts by weight of said elastomer.

6. The process of claim 5 wherein the impregnated sheet is heat treated at a temperature of at least about 100° C. for a period of at least about 0.5 hour.

References Cited in the file of this patent

UNITED STATES PATENTS

| | | |
|---|---|---|
| 2,726,967 | Eger | Dec. 13, 1955 |
| 2,754,280 | Brown et al. | July 10, 1956 |
| 2,791,571 | Wheelock | May 7, 1957 |
| 2,843,561 | Ingley | July 15, 1958 |
| 2,848,105 | Bartell et al. | Aug. 19, 1958 |
| 2,848,355 | Bartell | Aug. 19, 1958 |